United States Patent [19]

Hall

[11] Patent Number: 5,078,330
[45] Date of Patent: Jan. 7, 1992

[54] COMPACTOR FOR VEHICLE COVERS

[76] Inventor: Eugene Hall, 117 Plymouth Ave., Altamonte Springs, Fla. 32701

[21] Appl. No.: 505,978

[22] Filed: Apr. 9, 1990

[51] Int. Cl.$^5$ .................... B60J 11/00; B65H 75/42
[52] U.S. Cl. .................... 242/86.52; 150/166; 296/136
[58] Field of Search .......... 242/86.52, 86.5 R, 86.5 A, 242/106, 96; 296/98, 136; 135/87, 88; 150/166; 293/106, 117

[56] References Cited

U.S. PATENT DOCUMENTS

| | | | |
|---|---|---|---|
| 1,719,055 | 7/1929 | Herzer . | |
| 1,912,231 | 5/1933 | Wandscheer | 296/98 X |
| 1,918,423 | 7/1933 | Persinger . | |
| 2,688,513 | 9/1954 | Poirier | 296/98 |
| 2,724,395 | 11/1955 | Valentine | 135/1 |
| 2,801,667 | 8/1957 | Curran | 150/52 |
| 3,222,102 | 12/1965 | Lucas | 296/136 |
| 3,563,594 | 2/1971 | London | 293/1 |
| 3,774,958 | 11/1973 | Thorpe | 296/98 |
| 4,174,134 | 11/1979 | Mathis | 296/136 |
| 4,324,427 | 4/1982 | Huang et al. | 293/106 |
| 4,437,622 | 3/1984 | Heider | 242/86.5 R |
| 4,519,644 | 5/1985 | Song | 296/136 |
| 4,596,418 | 6/1986 | Koh | 296/136 |
| 4,629,390 | 12/1986 | Burke | 242/86.52 X |
| 4,632,329 | 12/1986 | Burley | 242/86.52 |
| 4,657,298 | 4/1987 | Yong | 296/136 |
| 4,684,165 | 8/1987 | Becker | 296/136 |
| 4,718,711 | 1/1988 | Rabbit | 296/136 |
| 4,720,135 | 1/1988 | Farina | 296/136 |
| 4,727,898 | 3/1988 | Guma | 135/87 |
| 4,732,421 | 3/1988 | Ross et al. | 296/136 |
| 4,764,998 | 8/1988 | Norris et al. | 242/86.52 X |
| 4,795,207 | 1/1989 | Clarke | 296/136 |
| 4,823,632 | 4/1989 | Harrod et al. | 74/342 |
| 4,825,889 | 2/1989 | Monteith | 135/88 |
| 4,834,446 | 5/1989 | Tung-Chow | 296/136 |
| 4,846,343 | 7/1989 | Rupert | 242/96 X |

*Primary Examiner*—John M. Jillions
*Attorney, Agent, or Firm*—James H. Beusse

[57] ABSTRACT

A battery powered electric motor driven rewinding and storing apparatus for flexible protective covers for vehicles. The apparatus has a framework enclosed by a flexible vinyl covering with an axle extending therethrough for winding a vehicle cover upon. One end of the axle attaches to a manual crank and the other to a gear box. A direct current electric motor drives the gear box from a low voltage battery. The gear box can be disengaged to unwind the cover or to facilitate manual rewinding. The apparatus includes an adjustable strap which allows attachment to different locking mechanisms in different automobile trunks when the apparatus is resting on the automobile bumper. Elastic straps are used to hold the apparatus in place on the bumper.

6 Claims, 2 Drawing Sheets

COMPACTOR FOR VEHICLE COVERS

BACKGROUND OF THE INVENTION

This invention relates to self-contained, lightweight, electric motor driven rewinding and storing apparatus for a flexible protective cover for vehicles.

Protective covers for vehicles have been known for many years and are typically constructed of a polyvinyl chloride material, canvas, or nylon. The purpose of these covers is to protect vehicles which are regularly left exposed to outside elements. Because of the inconvenience of collecting or removing the cover from a vehicle, folding the cover, and thereafter packing it into a reasonably sized container, many people have devised various ways of winding the covers onto axles or similar devices using either manually operated axles or motor driven axles. These axles are typically placed inside a container so that when the cover is wound on the axle, it resides within the container. Applicant has found that most of these prior art devices are cumbersome, inconvenient, and present storage problems in themselves.

SUMMARY OF THE INVENTION

It is an object of the present invention to provide an improved self-contained, lightweight, electric motor driven rewinding and storing apparatus for a flexible protective cover for a vehicle which overcomes the above and other disadvantages of the prior art.

In one form of the present invention, there is provided a self-contained, lightweight, electric motor driven rewinding and storing apparatus for a flexible protective cover for a vehicle which comprises a soft-sided container having a support frame for establishing a box-like configuration and a centrally located rotatable axle mounted in the container with opposite ends of the axle being accessible from opposite sides of the container. One of the axle units is adapted for receiving a manually operable crank for rotating the axle from one of the ends of the container. A gear box is mounted on an opposite side of the container and is connectable in driving relationship to another end of the axle. An electric motor is coupled to the gear box such that rotation of a rotor of the motor affects operation of the gear box for driving the axle. The gear box includes a gear engaging lever attached to one side thereof and extending outside of the container to allow the gear box to be disabled when the protective cover is to be unwound from the axle by manually pulling the cover. A battery is mounted adjacent the gear box and connected in a series electrical circuit with the motor through a switch. When the switch is operated, the motor is driven and winds the cover on the axle. The container is preferably formed of a vinyl material so that it is lightweight with only a support frame of rigid structure. At least one hole is formed in the bottom of the container to allow water to drip therefrom if the cover is wound up after being wet. The apparatus may be provided with hangers that are attachable to the frame for supporting the apparatus on a vehicle. An adjustable strap attached to the frame of the apparatus allows the apparatus to be suspended from a trunk locking mechanism on an automobile and to be held firmly against the rear of the automobile while the apparatus sets upon a bumper of the vehicle. A pair of elastic straps attached to the apparatus and having hooks at one end couple the apparatus to the bumper. One end of the protective cover is attached to the axle by a pair of straps. The straps have one end wound on the axle and a second end that is releasably connected to the cover. Preferably, the releasable coupling means comprises Velcro on the strap and the end of the cover.

BRIEF DESCRIPTION OF THE DRAWINGS

For a better understanding of the present invention, reference may be had to the following detailed description taken in conjunction with the accompanying drawings in which.

DETAILED DESCRIPTION OF THE INVENTION

Figure 1:
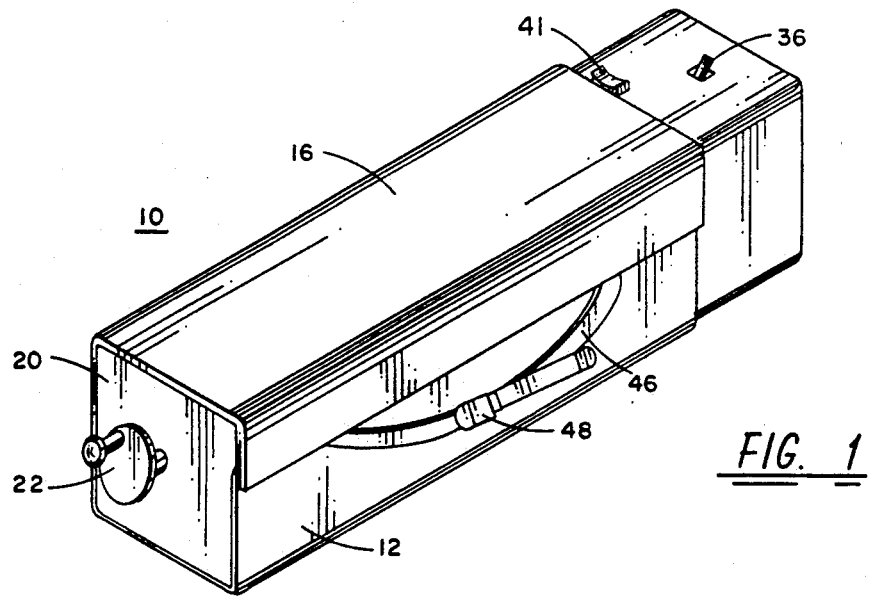
FIG. 1 is a front perspective view of a lightweight container for a vehicle cover in accordance with the present invention.
Figure 2:
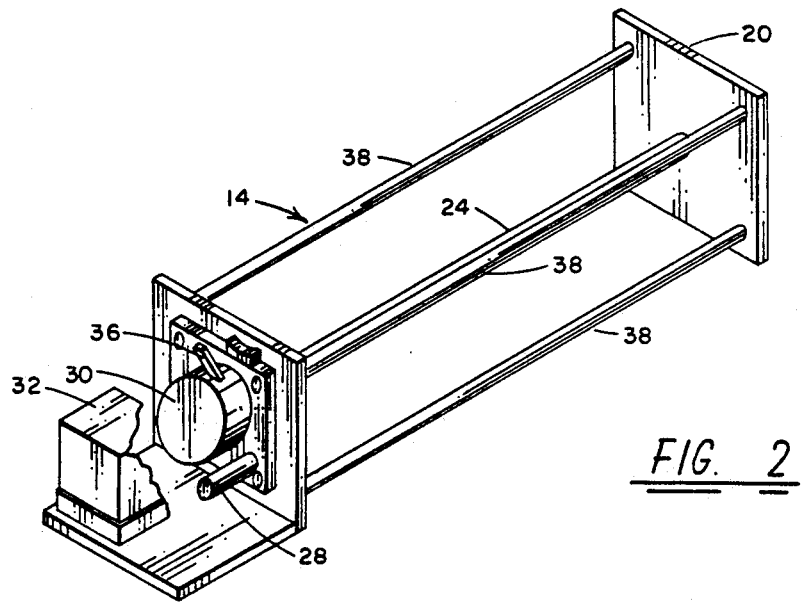
FIG. 2 is a perspective view of the apparatus of FIG. 1 with the outer cover and vehicle cover removed.
Figure 3:
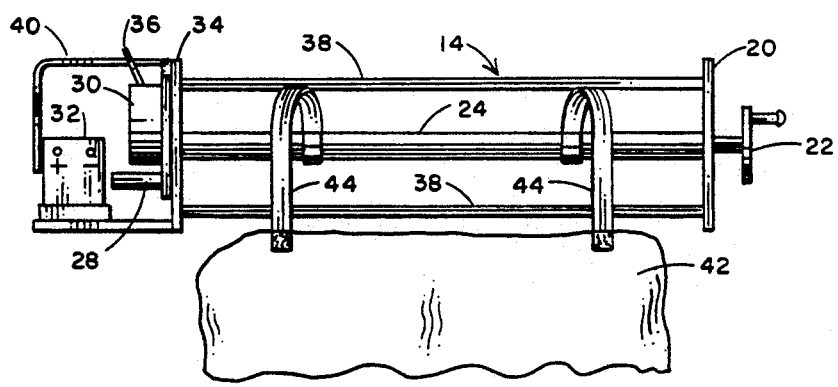
FIG. 3 is an elevation view of the apparatus of FIG. 2.

Referring generally to FIGS. 1, 2, and 3, the rewinding and packing apparatus of the present invention comprises a container indicated generally at 10 having an outer flexible covering 12 preferably formed of a polyvinyl material and an inner relatively rigid support frame 14 formed of plastic and metal or other suitably rigid construction materials. The outer polyvinyl covering fits about the support frame 14 and includes a hinged top flap 16. The hinge may be achieved through the flexibility of the polyvinyl material. The top flap 16 includes Velcro or other fasteners directly under the top flap 16 for holding the flap 16 in a normally closed position as shown. At a first end 20 of the apparatus, there is provided a manually operable hand crank 22 which is connected to an axle 24 extending through a major portion of the container. At an opposite end 26, there is provided an attached closed portion of the container which incorporates an electric motor 28, a gear box 30, and a battery 32. The gear box and motor are attached to an end plate 34 through which the axle 24 extends for connection into the gear box. The gear box 30 is preferably a single speed gear box having an externally extending lever 36 for selectively engaging and disengaging a connection between the gears in the gear box and the axle 24. Gear boxes of the type illustrated at 30 are well known in the art and further description is not believed necessary.

The end plates 20 and 34 are formed of a relatively rigid material such as thermal plastic. The plates 20 and 34 are spaced apart by means of support rods 38 positioned at the corners of each of the plates 20 and 34. The rods 38 may be metal rods and include tapped ends through which screws may be passed from the end plates 20 and 34 to form a unitary support frame. The axle 24 extends through each of the end plates 20 and 34 and is attached at one end to the hand operated handle 22 and at the other end to the gear box 30. The polyvinyl cover may be supported above and about the gear box 30 and battery 32 by means of preformed support members 40. These support members may be a formed plastic material or may be bent metal elements. Their function is simply to support the flexible soft vinyl covering above the motor, gear box, and battery. A switch 41 is mounted to the gear box housing and is electrically connected in series circuit between the battery 32 and the motor 28 for selectively supplying electrical power from the battery to the motor. The electrical wiring between the battery, the switch, and the motor is well known in the art and has been omitted for clarity.

The flexible cover for a vehicle is illustrated generally at 42 in FIG. 3. The cover is attached to the axle 24 by means of a pair of straps 44, each having one end wrapped on the axle 24 and another end which is attachable to an end of the cover 42. The ends of the straps attachable to the cover may include Velcro or other suitable attaching means for connecting the straps to the cover. It will be appreciated that rotation of the axle 24 is effective to initially wind the straps 44 about the axle and then to begin to wind the cover 42 around the axle so that the cover may be stored within the container.

Figure 4:
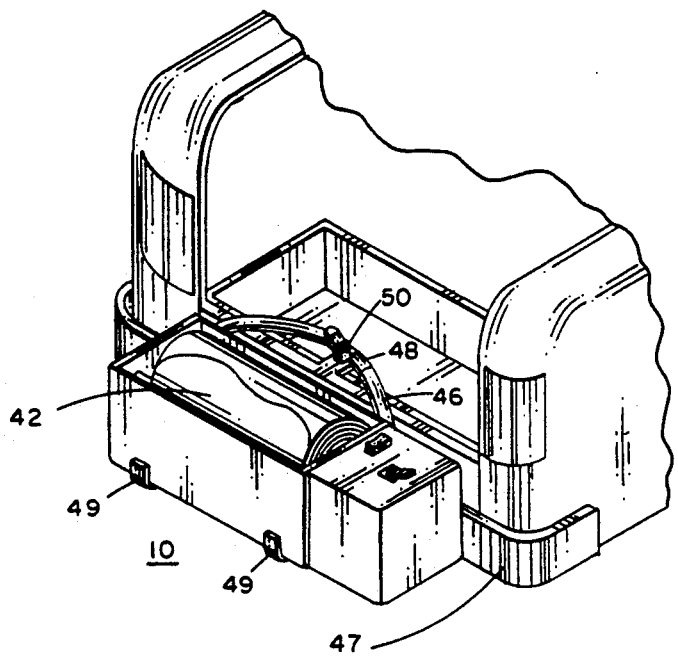
FIG. 4 illustrates one method of attaching the apparatus of the present invention to an automobile.
Figure 6:
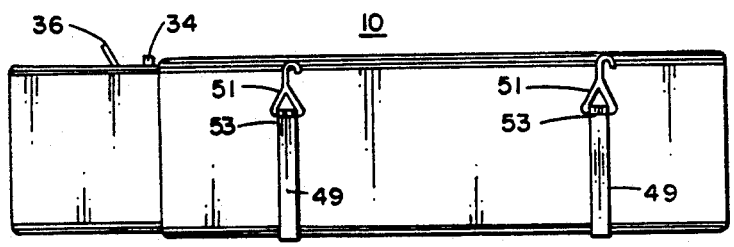
FIG. 6 is a rear elevation view of the apparatus of the present invention.

Turning now to FIG. 4, there is shown one method of hanging the apparatus 10 to the rear of a road vehicle such as an automobile. An adjustable strap 46, also visible in FIG. 1, is attached to the frame 14 and has sufficient length to extend outwardly of the container 10. In the arrangement as shown in FIG. 4, the container may be hung onto a locking mechanism 50 found in the trunk of most automobiles with the trunk lid open. In a preferred form, the strap 46 is provided with an adjustable buckle 48 to allow the strap to be adjusted to different lengths for accommodating different placement of the trunk locking mechanism in different automobiles. The container 10 rests upon the rear bumper 47 of the automobile and a pair of elastic straps 49 terminating in metal hooks 51 (see FIG. 6) are stretched downward and under container 10 until the hooks 51 are latched onto a lower edge of bumper 47. The elastic straps 49 are particularly useful if the cover is being rewound manually using crank 22 since such manual use is typically jerky or erratic and tends to displace the container from the bumper. The straps 49 also hold the container during motorized operation in the event that the cover 42 catches on the automobile. For storage purposes, the straps 49 may be held in place against the container 10 using Velcro strips, indicated at 53. The trunk lid can be closed over the straps 46 while unwinding the cover 42 from the axle 24. After the cover has been placed over the car, the strap 46 may be removed from the locking mechanism 50 (and the straps 44 from the cover 42) to allow the container to be placed inside the trunk and the trunk lid closed before pulling the end of the cover 42 over the rear of the vehicle. When it is desired to remove the cover from the vehicle and to rewind it within the container 10, the end of the cover adjacent the trunk lid may be pulled up to allow access to the trunk of the vehicle and the container removed from the trunk. The container is then hung as shown in FIG. 4 and the end of the cover attached to the straps 44. Actuating the switch 41 will then cause the motor 28 to energize the gear box 30 to begin winding the cover 42 about the axle 24. Preferably, before initiating the rewinding action, the sides of the cover along the sides of the vehicle are lifted up and folded towards the center of the vehicle to reduce the width of the cover and facilitate its winding about the axle 24. Once the cover 42 is fully wound within the container 10, the container may be removed from its position as shown in FIG. 4 and placed in the trunk of the vehicle.

Figure 5:
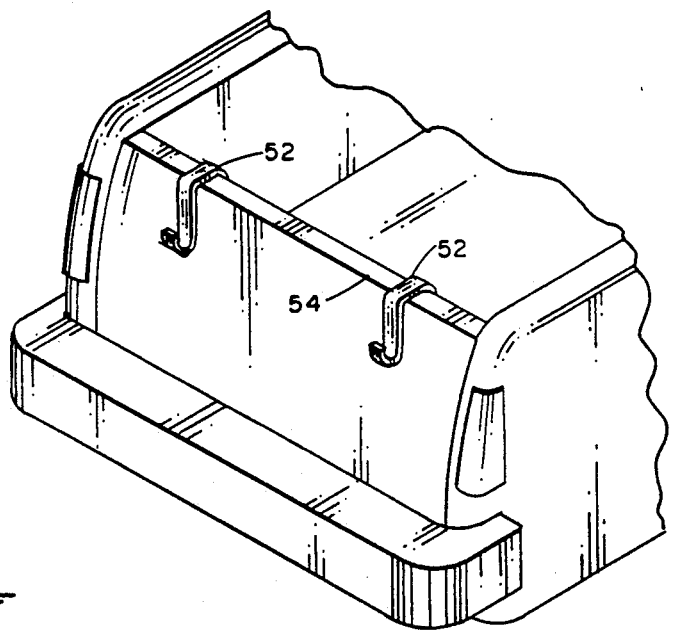
FIG. 5 illustrates one method of attaching the apparatus of the present invention to the tailgate of a pick-up truck.

FIG. 5 illustrates a method of using the inventive rewinding and packing container with a pick-up truck. In this embodiment, a pair of hangers 52 are formed to have one end which fits over the tailgate 54 of the truck and another end of the hangers is upturned so that they may hook on one of the support rods 38 within the container frame. This allows the container to be hung adjacent the tailgate of the truck. The operation of the container is then essentially as is described with regard to FIG. 4.

The inventive container 10 is relatively lightweight since the only shell to the apparatus is the polyvinyl material covering the frame 14. The frame itself can be made of molded plastic and also be relatively lightweight. Since the cover is soft and flexible, it tends to sag in the bottom if water accumulates within the container. Accordingly, Applicant has found that it is only necessary to provide drain holes in the bottom of the container using commercially available brass eyelets to define the holes. Because the water tends to deform the soft, flexible material, the eyelets may be placed at the low points near the center of the container and the water collected within the container if the cover 42 is wound up wet will drain easily.

In the event that the motor 28 or gear box or the battery 32 fail, the cover may be wound on the axle 24 by moving the gear lever 36 to a position to disengage the gears in the gear box 30 so that the axle may freely spin. The crank handle 22 could then be manually turned to rapidly wind the cover 42 into the container. The gear lever 36 is also preferably used to disengage the gears in the gear box when the cover 42 is removed from the container 10. By disengaging the gears, the axle 24 spins freely and facilitates the easy removal or unwinding of the cover 42 from the axle 24.

While the invention has been described in what is presently considered to be a preferred embodiment, various modifications and variations will be apparent to those skilled in the art. Accordingly, it is intended that the invention not be limited to the specific embodiment but be interpreted within the full spirit and scope of the appended claims.

What is claimed is:

1. A self-contained, lightweight, electric motor driven rewinding and storing apparatus for a flexible protective cover for a vehicle, comprising a soft sided container having a support frame for establishing a box-like configuration, a centrally located rotatable axle mounted in said container with opposite ends of the axle being accessible from opposite sides of the container, one of said ends being adapted for receiving a manually operable crank for rotating said axle from one of said opposite sides of said container, a gear box mounted on another of said opposite sides and being connected in gear driving relation to another end of said axle, an electric motor coupled in driving relation to said gear box such that rotation of a rotor of said motor effects operation of said gear box for driving said axle, a gear engaging lever attached to said gear box and extending outwardly of said container for enabling disconnection of gears within said gear box whereby said axle can be rotated without operation of said gear box, a battery mounted adjacent said motor and switch means mounted in a series electrical circuit with said battery and said motor for selectively coupling electrical power to said motor, said axle including means for attaching one end of said cover thereto whereby energization of said motor is effective to wind said cover about said axle within said container, and adjustable strap means attached to said apparatus, said strap means comprising a first and a second strap extending from said apparatus and being releasably connectable one to the other at distal ends thereof, said straps being adjustable in length for extending from said apparatus, when said apparatus is positioned on a bumper of a vehicle, around a trunk locking device in a trunk of the vehicle for holding said apparatus against an adjacent surface of the vehicle.

2. The apparatus of claim 1 wherein said means for attaching said cover comprises first and second straps each having one end attached to said axle and a second end releasably attachable to said cover.

3. The apparatus of claim 1 and including at least first and second elastic straps each having one end attached to said container and a second end adapted to hook onto an underside of a vehicle bumper for supporting said container in a predetermined stable position on an upper surface of the bumper.

4. The apparatus of calim 3 wherein said vehicle comprises a pick-up truck, the apparatus further including a pair of hangers each having a downwardly turned end and an upwardly turned end, said downwardly turned ends of said hangers fitting onto a tailgate of the truck, said upwardly turned ends being coupled to said apparatus and said adjustable strap means being fastenable to a bumper of the truck, said hangers supporting said apparatus on the truck.

5. The apparatus of claim 1 wherein said container is formed of vinyl and includes a flexible top hinged on one side and velcro fasteners on another side for closing said container.

6. A method for winding and packing a protective cover for a vehicle using an apparatus comprising an electric motor driven rewinding and storing apparatus for the cover having a box-like container, a rotatable axle mounted in the container with opposite ends of the axle being accessible from opposite sides of the container, a gear box mounted on one of the opposite sides and being connected in gear driving relation to one end of the axle, an electric motor coupled in driving relation to the gear box such that rotation of a rotor of the motor effects operation of the gear box for driving the axle, a gear engaging lever attached to the gear box and extending outwardly of the container for enabling disconnection of gears within the gear box whereby the axle can be rotated without operation of the gear box, a battery mounted adjacent the motor and switch means mounted in a series electrical circuit with the battery and the motor for selectively coupling electrical power to the motor, the axle including means for attaching one end of the cover thereto whereby energization of the motor is effective to wind the cover about the axle within the container, and adjustable strap means attached to the apparatus, the strap means comprising a first and a second strap extending from the apparatus and being releasably connectable one to the other at distal ends thereof, the straps being adjustable in length for extending from the apparatus, when the apparatus is positioned on a bumper of a vehicle, for holding the apparatus against an adjacent surface of the vehicle, said method comprising the steps of:

attaching said one of said cover to said axle;

folding sides of said cover toward a center of the vehicle until said folded cover is about the width of said apparatus;

engaging said lever and operating said switch to energize said motor whereby said axle is rotated to wind said cover thereon;

releasing said switch when said cover is wound on said axle in said container; and removing said container from the vehicle.

* * * * *